United States Patent Office 3,407,032
Patented Oct. 22, 1968

3,407,032
METHOD FOR PREPARING REDUCED TUNGSTEN OXIDE
Lance Kenneth Ziering, Stamford, Conn., assignor to American Cyanamid Company, Stamford, Conn., a corporation of Maine
No Drawing. Filed Jan. 5, 1966, Ser. No. 518,796
10 Claims. (Cl. 23—22)

ABSTRACT OF THE DISCLOSURE

A novel process is provided for preparing solid, reduced tungsten oxide which comprises the steps of: admixing in at least stoichiometric amounts (a) a metatungstate selected from the group consisting of ammonium metatungstate, sodium metatungstate and potassium metatungstate and (b) an alkali metal borohydride in an aqueous solution maintained at a pH between about 10 and 14, dropwise adding to the latter solution a non-oxidizing acid to effect the precipitation of said metatungstate as reduced tungsten oxide, terminating the addition of said acid when precipitation is no longer observed, and recovering a solid, amorphous, reduced tungsten oxide.

---

The present invention relates to a novel method for preparing a solid, reduced, amorphous tungsten oxide. More particularly, it relates to a method for effecting alkali metal borohydride reduction of a tungstate solution under controlled pH conditions and at ambient temperatures whereby a solid, amorphous precipitate comprising reduced tungsten oxide is recovered.

It is well known that the reduction of solid tungsten trioxide can be effected by means of hydrogen in a closed reaction vessel at elevated temperatures, usually in the range from about 300° C. to about 800° C., and under a positive pressure. Unfortunately, the utilization of elevated temperatures and autogenous pressures substantially increases the cost for preparing reduced tungsten oxide. In addition, a need exists for effecting the co-precipitation of tungsten with other metallic substances. This cannot be accomplished, if the other substance is adversely affected by elevated temperatures. Hence, attempts have been made to carry out the reduction of a tungstate ion at ambient temperatures and pressures to prepare a useable precipitate. None has been successful. For instance, the treatment of ammonium metatungstate solution with sodium borohydride under alkaline conditions does not result in any reaction. Similarly, recoverable solid product is not obtained when ammonium metatungstate is treated with sodium borohydride under acid conditions. Employing the latter technique, only colloidal tungsten blue, in contradistinction to a precipitate, is formed. If a method for reducing tungsten trioxide in solution to recover a solid, reduced, amorphous tungsten oxide could be found which is inexpensive and straightforward, such a method would fill a long-felt need in the art.

It is, therefore, a principal object of the present invention to obtain recoverable solid, reduced, amorphous tungsten oxide from a tungstate solution. It is a further object of the invention to provide a procedure whereby reduced tungsten oxide is obtained in solid, amorphous form utilizing ambient temperatures and atmospheric pressures. Other objects and advantages will be noted from the ensuing detailed description.

To this end, it has been unexpectedly found that a reduced tungsten oxide precipitate can be prepared from a metatungstate solution utilizing an alkali borohydride reducing agent in alkaline solution. This is accomplished by providing a non-oxidizing acid to the latter alkaline solution under controlled pH conditions.

According to the process of the invention, an aqueous ammonium metatungstate solution in the presence of an alkali metal borohydride to which has been added sufficient alkali, such as sodium hydroxide, potassium hydroxide or equivalents thereof to provide a pH between about 10 and 14, is treated with a non-oxidizing acid. The latter treatment is critical and is carried out by the addition of the acid to the alkaline solution in a dropwise manner until no further precipitate is observed. The treatment then is terminated. It is found that the precipitation or the reduced tungsten oxide occurs as an amorphous, readily recoverable product.

In general, for purposes of this invention, any alkali metal borohydride reducing agent can be employed in at least stoichometric amounts. Excess acid with respect to the tungstate being treated can be tolerated. Illustrative of the latter borohydrides which may be mentioned are: sodium borohydride, potassium borohydride and lithium borohydride; as exemplary of the metatungstate to be reduced thereby, the following can be mentioned: ammonium metatungstate, potassium metatungstate and sodium metatungstate.

Advantageously, any non-oxidizing acid can be employed. Illustrative of such acids are: hydrochloric acid, acetic acid and benzoic acid. As stated above, drop-wise addition of the acid to the alkaline solution of the borohydride and metatungstate is critical. For instance, where the non-oxidizing acid is added to the ammonium metatungstate prior to the addition of sodium borohydride, reaction does not take place. Hence, the manner and order of addition of the reactants is also of critical import.

The following examples will illustrate the invention wtih greater particularity. It is to be understood that these are merely illustrative and are not to be taken as limitative. Unless otherwise specified, the parts are by weight.

Example 1

This example illustrates the effect of reducing agent added to an alkaline solution.

Thirty (30) parts of ammonium metatungstate containing the equivalent of about 90% tungsten trioxide was dissolved in 500 parts of water and 100 parts by volume of 10% sodium hydroxide was used to adjust the solution pH to about 12. Sodium borohydride (200 parts by volume of a 10% solution) was dropwise added without any visible reaction.

Example 2

This example illustrates the effect of dropwise acid addition to an alkaline solution containing a borohydride.

The procedure of Example 1 is repeated in every detail. There is then added dropwise a 50% acetic acid solution to the ion alkaline solution containing tungstate and reducing agent. A reaction occurred immediately, resulting in a voluminous brown precipitate. Vigorous hydrogen evolution was also apparent during the precipitation. The dropwise addition of approximately 100 parts (by volume) of the acetic acid was sufficient to bring the solution to a pH equal to about 7. At this time, no further precipitation was observed and the acid addition was terminated. The precipitate was then recovered by centrifugation and oven-dried. It weighed 23.2 parts which represented an 76% yield and was analyzed as reduced, amorphous tungsten oxide.

The mother liquor from the reaction was retreated in an identical fashion as was the original solution and an additional quantity of precipitate, namely, 1.5 parts or 5.5%, was recovered.

Substituting for the acetic acid in the above example, hydrochloric acid or benzoic acid, there resulted a reduced, amorphous tungsten oxide in substantially the same yield.

I claim:
1. A process for preparing solid, reduced tungsten oxide which comprises the steps of: admixing in at least stoichiometric amounts (a) a metatungstate selected from the group consisting of ammonium metatungstate, sodium metatungstate and potassium metatungstate and (b) an alkali metal borohydride in an aqueous solution maintained at a pH between about 10 and 14, dropwise adding to the latter solution a non-oxidizing acid to effect the precipitation of said metatungstate as reduced tungsten oxide, terminating the addition of said acid when precipitation is no longer observed, and recovering a solid, amorphous, reduced tungsten oxide.

2. A process according to claim 1 wherein the non-oxidizing acid is acetic acid.

3. A process according to claim 1 wherein the non-oxidizing acid is hydrochloric acid.

4. A process according to claim 1 wherein the non-oxidizing acid is benzoic acid.

5. A process according to claim 1 wherein the alkali metal borohydride is sodium borohydride.

6. A process according to claim 1 wherein the alkali metal borohydride is potassium borohydride.

7. A process according to claim 1 wherein the alkali metal borohydride is lithium borohydride.

8. A process according to claim 1 wherein the metatungstate is sodium metatungstate.

9. A process according to claim 1 wherein the metatungstate is potassium metatungstate.

10. A process according to claim 1 wherein the metatungstate is ammonium metatungstate.

References Cited

UNITED STATES PATENTS 2,735,748   2/1956   Wainer _____ 23—140 X

OTHER REFERENCES

Mellor: "A Comprehensive Treatise on Inorganic and Theoretical Chemistry," vol. 11, Longmans, Green & Co., New York, 1931, pp. 745–749.

Metal Hydrides Manual: "Sodium Borohydride-Potassium Borohydride," Metal Hydrides Inc., Beverly, Mass., 1958, pp. 1, 8, 9 and 16 to 18.

OSCAR R. VENTIZ, *Primary Examiner.*

H. T. CARTER, *Assistant Examiner.*